United States Patent [19]

Komurasaki et al.

[11] 4,374,510

[45] Feb. 22, 1983

[54] IGNITION TIMING CORRECTING SYSTEM FOR INTERNAL COMBUSTION ENGINE

[75] Inventors: Satoshi Komurasaki; Atsushi Ueda; Tsuneo Yamane, all of Himeji, Japan

[73] Assignee: Mitsubishi Denki Kabushiki Kaisha, Tokyo, Japan

[21] Appl. No.: 249,458

[22] Filed: Mar. 31, 1981

[30] Foreign Application Priority Data

Apr. 3, 1980 [JP] Japan .................................. 55/44406

[51] Int. Cl.³ .............................................. F02D 5/04
[52] U.S. Cl. ............................................ 123/418; 123/425
[58] Field of Search ............... 123/418, 421, 425, 424, 123/426

[56] References Cited

U.S. PATENT DOCUMENTS

| | | | |
|---|---|---|---|
| 3,815,560 | 6/1974 | Wahl et al. | 123/426 X |
| 3,990,417 | 11/1976 | Tershak | 123/418 X |
| 4,125,097 | 11/1978 | Gunderson | 123/418 X |
| 4,158,350 | 6/1979 | Moller et al. | 123/421 X |

Primary Examiner—Tony M. Argenbright
Attorney, Agent, or Firm—Wenderoth, Lind & Ponack

[57] ABSTRACT

An ignition timing correcting system generates a reference signal at a reference angular position of a rotating internal combustion engine and an ignition signal leading it by a constant phase. In response to a control signal from a movable tap on a potentiometer, the ignition signal is normally retarded in phase to form a retarded ignition signal. The phase comparison of the two signals produces an advance or a retardation signal formed of a pulse train having a pulse-width corresponding to a phase difference between the two ignition signals. During the idling of the engine, the correcting signal drives forwardly or reversely an electric reversible motor to move the tap on the potentiometer to adjust the control signal. During the knocking of the engine, a knocking sensed signal is added to the control signal from the potentiometer to further retard the ignition signal. During the idling of the engine, the knocking sensed signal is disabled to retard the ignition signal.

4 Claims, 3 Drawing Figures

IGNITION TIMING CORRECTING SYSTEM FOR INTERNAL COMBUSTION ENGINE

BACKGROUND OF THE INVENTION

The present invention relates to a system for correcting a shift of the ignition timing occurring in an ignition device used with internal combustion engines.

In recent years ignition devices used with motor vehicles have been and are required to have increased output energy and have improved accuracy and stability of the ignition timing in view of the purification requirements of the exhausted gases from motor vehicles. Under these circumstances, ignition devices of the conventional contact breaker type are increasingly replaced by those of the fully transistorized type without contact breakers.

In these fully transistorized type of ignition devices, the ignition timing signal is provided by a contactless signal generator such as an electromagnetic coil generator, an integrated circuit Hall generator or the like, but such a generator is disposed within a mating distributor which is, in turn, usually driven by a crankshaft connected to an associated internal combustion engine through a timing belt or the like. Even in fully transistorized ignition devices, therefore, a shift of the ignition timing due to ageing change in the distributor driving system is increased with time. This shift of the ignition timing appears as a shift of the ignition timing developed during the idling of the engine and has greatly affected the output from the engines and the ingredients of the exhaust gases from the engines.

Therefore, the shift of the ignition timing is undesirable in view of measures to counter the exhaust gas emissions from internal combustion engines. Thus, it is desirable to correct a shift of the ignition timing of internal combustion engines by some measure. Furthermore, it is desirable to correct the ignition timing when knocking occurs in internal combustion engines for the purpose of stopping the knocking.

SUMMARY OF THE INVENTION

Accordingly, it is an object of the present invention to provide a new and improved system for correcting the ignition timing of an internal combustion engine by generating a reference signal at a reference angular position and an ignition signal with the advance characteristic preliminarily leading the reference signals by a predetermined angle, producing a retarded ignition signal by retarding the ignition signal and controlling the retardation of the ignition signal so as to put the phase relationship between the reference signal and the retarded ignition signal in a predetermined state when the internal combustion engine is operated in a predetermined mode, whereby the retarded ignition signal is corrected to the regular ignition timing.

It is another object of the present invention to provide a new and improved system for correcting an ignition timing of an internal combustion engine involved, which system eliminates the necessity of adjusting the initial ignition timing and also corrects shifts of the ignition timing due to ageing by enabling the correction during the normal mode of operation of the internal combustion engine through the use of a control magnitude stored in memory means.

It is still another object of the present invention to provide a new and improved system for correcting the ignition timing of an internal combustion engine which system is responsive to knocking occurring in the engine so as to effectively control the ignition timing with a simple construction by utilizing a phase shifter means for correcting the ignition timing along with means for controlling the control magnitude on memory means, said magnitude applied, as a control input to the phase shifter means in accordance with the knocking state of the engine.

The present invention provides an ignition timing correcting system for an internal combustion engine comprising a reference generator means for generating a pulsed reference signal at a reference angular position of the rotation of an internal combustion engine, and an ignition generator means for generating a pulsed ignition signal at an angular position of the rotation of the engine leading that for the pulsed reference signal, the ignition signal having a predetermined advance characteristic. A phase shifter means is connected to the ignition generator means to retard the pulsed ignition timing signal in response to a control input applied thereto to produce an output, and the ignition means is connected to the phase shifter means to generate a pulsed ignition voltage in response to the output from the phase shifter means. A memory means is disposed to generate a control signal applied to the phase shifter means to determine the amount of retardation of the ignition signal provided by the phase shifter. The present invention further comprises a control means for controlling the magnitude of the control signal in response to the phase relationship between the reference signal and the output from the phase shifter means so as to impart to the output from the phase shifter a predetermined phase relative to the reference signal in a predetermined mode of operation of the internal combustion engine, and still further comprises a knocking sensor means for sensing the knocking status of the internal combustion engine and to produce a knocking sensed output. A correction means controls the magnitude of the control input which is determined by the magnitude of the control signal to the phase shifter means with the knocking sensed output from the knocking sensor means.

BRIEF DESCRIPTION OF THE DRAWING

The present invention will become more readily apparent from the following detailed description taken in conjunction with the accompanying drawing in which.

DESCRIPTION OF THE PREFERRED EMBODIMENTS

Figure 1:
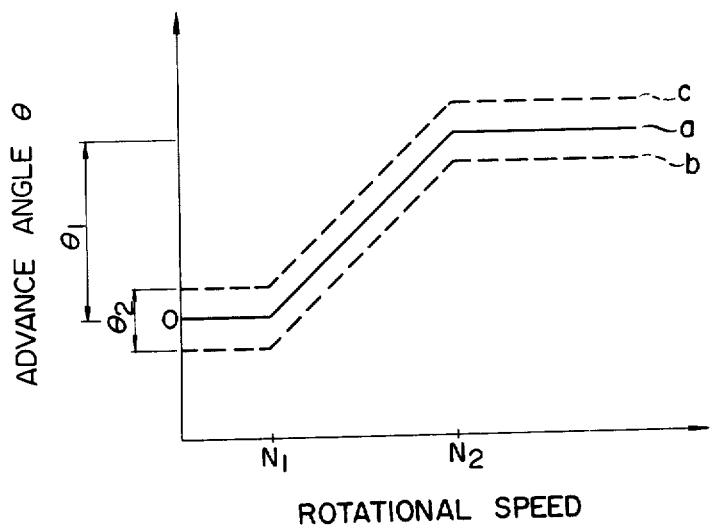
FIG. 1 is a graph illustrating the centrifugal advance characteristic of the ignition time previously developed in interval combustion engines.

For a better understanding of the nature of the present invention, a shift of an ignition timing will now be described in conjunction with FIG. 1 wherein there is illustrated the centrifugal advance characteristic of the ignition timing. In FIG. 1, the axis of the ordinate represents an advance angle $\theta$ of the ignition timing and the axis of the abscissa represents the rotational speed of the internal combustion engine. Solid line a designates the regular advance characteristic of the ignition timing and dotted lines b and c located below and above the solid line a respectively designate the advance characteristics of the ignition timing shifted respectively to the retarding and advancing sides due to the ageing of an associated system for driving the distributor.

In the early days of any internal combustion engine, the ageing results in the ignition timing having no shift. Therefore during the start or idling of the engine having a rotational speed of $N_1$ or less, the ignition timing is of a reference magnitude or a zero advance angle as shown by the solid line a shown in FIG. 1. As the rotational speed of the engine rises from its magnitude $N_1$, the ignition timing advances until the ignition timing reaches a maximum angle $\theta_1$ at the speed $N_2$ of the engine as shown by the solid line a in FIG. 1. Thereafter, the ignition timing is held at the maximum angle $\theta_1$ also shown by the solid line a in FIG. 1 until the engine reaches a maximum speed.

However, the longer the service of the engine, the more the ignition timing is shifted due to ageing as described above.

On the other hand, the machining accuracy of distributors and internal combustion engines may result in an initial shift of the ignition timing or the initial adjustment. This initial shift of the ignition timing has been generally corrected by adjusting the angular position of the distributor relative to a reference. To this end, a mounting for the distributor is designed and constructed so that it is rotatable. Such a construction is convenient for the official checkout of motor vehicles, whereas it may cause a danger that the ignition timing is intentionally put out of order. This has resulted in the deterioration of the exhaust gases from internal combustion engine.

Various factors as described above have caused the ignition timing to be shifted as shown by the dotted line b or c in FIG. 1. The shift $\theta_2$ of the ignition timing, as shown in FIG. 1, is undesirable in view of measures to counter the exhaust gas emissions and it is necessary to correct the shift of the ignition timing according to some measure.

On the other hand there have been proposed technologies for sensing knocking occurring in the internal combustion engine and for controlling electronically the retardation of the ignition timing of the engine in accordance with a knocking sensed output to thereby control the ignition timing to the optimum magnitude located adjacent to a boundary between a knocking zone and a non-knocking zone of the internal combustion engine.

Figure 2:
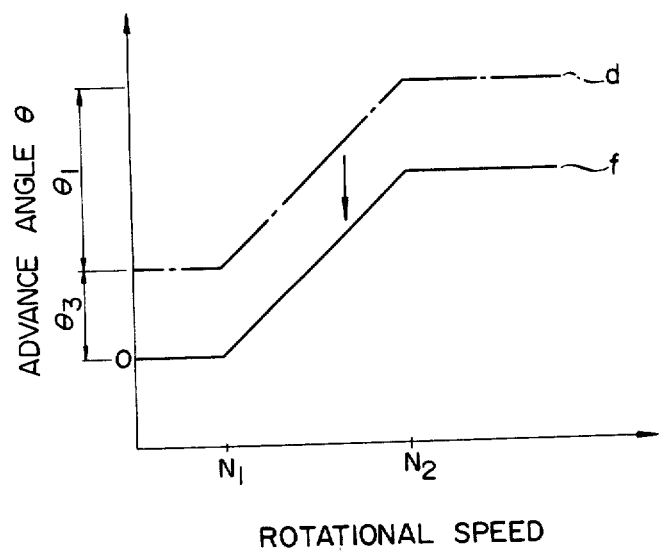
FIG. 2 is a graph similar to FIG. 1 and useful in explaining the fundamental principles of the present invention.

FIG. 2 shows the centrifugal advance characteristics useful in explaining the fundamental principles of the present invention. In FIG. 2, the axis of the ordinate represents an advance angle $\theta$ of the ignition timing of an associated internal combustion engine and the axis of the abscissa represents the rotational speed of the engine as in FIG. 1. Broken line d designates the advance characteristics of ignition timing signals obtained with an ignition generator disposed within an associated distributor and leading the desirable regular advance characteristic designated by solid line f by a constant angle $\theta_3$. Thus, by retarding the ignition timing signal by the constant angle $\theta_3$ over the entire range of rotation of an associated internal combustion engine, the advance characteristic d can result in the regular advance characteristic f.

More specifically, the present invention is arranged to generate from an ignition generator a pulsed ignition signal having a phase leading a regular phase by more than the width of variations in ignition timing, and to sense a phase difference of the ignition signal relative to the regular phase, for example, during the idling of an associated internal combustion engine and store it in a suitable memory means. The width of variation in ignition timing corresponds to an initial shift or adjustment angle due to the machining accuracy of the internal combustion engine and an associated distributor and a varied angle due to the ageing of the internal combustion engine. The stored phase difference is used to retard the ignition signal to the regular phase to thereby correct the ignition timing.

Figure 3:
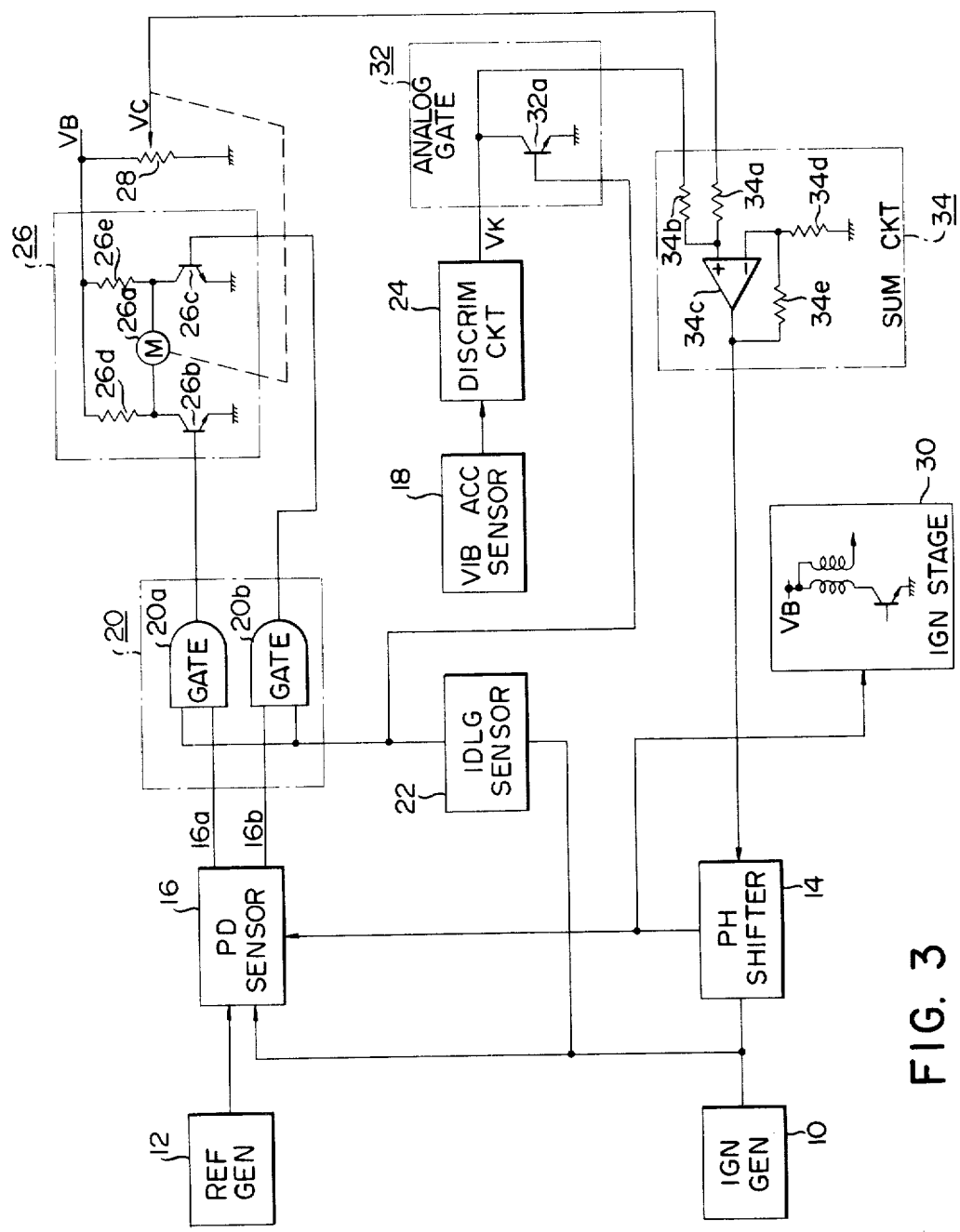
FIG. 3 is a combined circuit and block diagram of one embodiment according to the ignition timing correcting system of the present invention used with internal combustion engines.

Referring now to FIG. 3, there is illustrated one embodiment according to the ignition timing correcting system of the present invention used with internal combustion engines. The illustrated arrangement comprises an ignition generator 10 disposed within an associated distributor (not shown), a reference generator 12 disposed on a crankshaft for an associated internal combustion engine, a phase shifter 14 connected to the ignition generator 10, and a phase difference sensor 16 connected to the ignition and reference generators 10 and 12 respectively and also connected to the phase shifter 14. The phase difference sensor 16 has a pair of outputs 16a and 16b which are connected to a gate circuit generally designated by the reference numeral 20.

As shown in block 20, the gate circuit 20 has a pair of "AND" gates 20a and 20b each having a first input connected to the output 16a or 16b of the phase difference sensor 16, and a second input connected to an idling sensor 22 and each having an output.

The gate circuit 20 has its pair of outputs connected to a reversible driving device generator generally designated by the reference numeral 26.

The reversible driving device 26 is shown in block 26 as including an electric reversible motor 26a, a pair of common emitter NPN transistors 26b and 26c having respective base electrodes connected to the outputs of the "AND" gates 20a and 20b in the gate circuit 20 and respective collector electrodes connected across the reversible motor 26a. The collector electrodes of the transistors 26b and 26c are also connected via respective collector resistors 26d and 26e to a variable resistor, in this case, a potentiometer 28. The potentiometer 28 is then connected between a voltage point $V_B$ and ground and includes a movable tap which is controlled by the reversible motor 26a and which is connected to the phase shifter 14. The phase shifter 14 is further connected to an ignition stage generally designated by the reference numeral 30 and shown as including a well known ignition coil and a well known common emitter NPN transistor serving as a switch connected to a primary winding of the ignition coil which is, in turn, connected to a voltage point $V_B$.

The arrangement further comprises an acceleration sensor 18, a discriminator circuit 24 and an analog gate 12 connected in series to one another in the named order. The discriminator circuit 24 includes a frequency filter, a level determination circuit, an integrating circuit, etc., although those components are not shown only for purposes of illustration. The analog gate is shown in block 32 as including a common emitter NPN transistor 32a having a base electrode connected to the idling sensor 22 and also to a summation circuit generally designated by the reference numeral 34.

The summation circuit 34 includes a first resistor 34a connected to the movable tap on the potentiometer 28, a second resistor 34b connected to the collector electrode of the transistor 32a forming the analog gate 32, and an operational amplifier 34c having a positive input connected to the resistors 34a and 34b and a negative input connected to ground through a bias resistor 34d. The negative input to the operational amplifier 34c is connected to the output thereof through a feedback resistor 34e. The output of the operational amplifier 34c is connected to the phase shifter 14.

In the summation circuit 34 the resistors 34a, 34b, 34d and 14e are equal in magnitude of resistance and higher in magnitude of resistance than the potentiometer 28. Thus, the operational amplifier 34c provides an output voltage equal to the sum of a voltage $V_C$ at the movable tap on the potentiometer 28 and the voltage $V_K$ at the collector electrode of the transistor 32a.

The arrangement of FIG. 3 is operated as follows: The ignition generator 10 generates an ignition signal having the advance characteristic (see broken line d, FIG. 2) dependent upon the rotational speed of the internal combustion engine. The ignition signal is controlled by a signal from the movable tap on the potentiometer 28 through the summation circuit 34 to produce a retarded ignition timing signal. The phase shifter 14 is, for example, operative to charge and discharge a capacitor (not shown) which receives a constant current dependent upon the control input applied thereto within each time period of the ignition signal, inverting one to the other of the charging and discharging upon a voltage across the capacitor reaching a predetermined level, and making this inversion timing a retardation timing to thereby control the retardation of the ignition signal in accordance with or in proportion to the control input. The retarded ignition signal is applied to both the ignition stage 30 and the phase difference sensor 16.

The ignition stage 30 is responsive to the retarded ignition signal to produce an ignition voltage.

On the other hand, the reference generator 12 senses a reference angular position of the crankshaft to generate a pulsed reference signal at a predetermined angular position remaining unchanged with the rotation of the internal combustion engine. The regular angular position is determined so as to correspond to the angular position where the engine is required to ignite in the idling mode of operation. Therefore, the reference signal serves as a reference for the correction of the ignition timing. The reference and retarded ignition signals are supplied to the phase difference sensor 16 which, in turn, senses a phase difference occurring between the retarded ignition signal and the reference signal to produce an advance or a retardation correcting signal as the case may be, formed of a pulse train having a pulse width as determined by the sensed phase difference. The advance or retardation correcting signal is delivered to the output 16a or 16b of the phase difference sensor 16 respectively.

The idling sensor 22 receives the pulsed ignition signal from the ignition generator 10 to sense or determine if the internal combustion engine is in the idling mode of operation. This determination is effected on the basis of the speed of the engine. If so, the idling sensor 22 delivers an idling signal to both the analog gate 32a and the gate circuit 20 comprising the two "AND" gates 20a and 20b.

The analog gate 32 is responsive to the idling signal to turn the transistor 32a on to bypass an output from the discrimination circuit 24 to ground.

The gate circuit 20 also controls the passage of the correcting signal therethrough in response to the output from the idling sensor 32. More specifically, during the idling mode of operation as determined by the idling sensor 22, either one of the "AND" gates 20a and 20b is gated to pass the advance or retardation correcting signal from the phase difference sensor 16 therethrough.

The advance or retardation correcting signal passed through the gate circuit 20 is applied to either one of the transistors 26b or 26c in the reversible driving device 26 as the case may be. That transistor 26b or 26c applied with the correction signal is turned on to rotate the reversible motor 26a in a direction as determined by the type of the correcting signal developed at that time.

During this rotation of the reversible motor 26a, the movable tap is moved along the potentiometer 28 toward the end thereof as determined by the direction of rotation of the reversible motor 26a until it is stopped and maintained at its adjusted position on the potentiometer 28 upon the end of the correction signal. Therefore, the potentiometer 28 generates a control voltage $V_C$ as determined by the adjusted position of the movable tap thereon and applies the control voltage to the phase shifter 14 through the summation circuit 34. The mechanical position of the potentiometer tap serves as a memory device in that when the motor 26a is at rest, the control voltage $V_C$ remains at the last value set by the motor.

The phase shifter 14 is responsive to a difference in the control voltage previously applied thereto and that control voltage now applied thereto to control the retardation of the ignition timing signal in a direction to decrease a phase difference between the reference and retarded signal. In other words, the phase shifter 14 produces the retarded ignition signal having a retardation controlled in accordance with the phase relationship between the reference and retarded ignition signals through the closed loop control. Therefore, the retarded ignition signal has its phase corrected to the reference position resulting from the reference signal during the idling mode of operation of the associated internal combustion engine.

When the internal combustion engine is put in any mode other than the idling mode of operation, the idling sensor 22 produces an output at a low level, and the correcting signal from the phase difference sensor 16 is prevented from passing through the gate circuit 20 because the output from the idling sensor 22 is at its low level. Therefore, the reversible driving device 26 is stopped and the potentiometer 28 stores and holds the control voltage at the position of the movable tap thereon adjusted through the closed loop control effected in the idling mode of operation as described above. Therefore, even when the internal combustion engine is operated in any mode other than the idling mode, the advance characteristic of the ignition signal is corrected by the correcting angle provided in the idling mode of operation thereof. This results in ignition sparks having the regular advance characteristic as shown at solid line f in FIG. 2.

Even if the ignition signal would change in angular position of occurrence thereof due to a ageing in a route along which the distributor is driven, a variation in or a displacement of a position where the distributor is mounted or the like, the ignition timing is always and automatically corrected to its regular angle position relative to the reference signal acting as a reference.

On the other hand, the acceleration sensor 18 is disposed on the internal combustion engine to sense an acceleration generated by the engine due to its knocking and delivers the sensed acceleration to the discrimination circuit 24. The discrimination circuit 24 removes noise signal components and picks up a knocking signal from the received acceleration. The knocking signal thus picked up is converted to a corresponding DC voltage $V_K$. That DC voltage $V_K$ is applied to the analog gate 32a.

When the internal combustion engine is operated in any mode other than the idling mode, the transistor 32a in the analog gate 32 is put in its OFF state due to an output provided at that time by the idling sensor 22. Therefore, the discrimination circuit 24 applies to the summation circuit 34 the DC voltage $V_K$ which corresponds to a knocking strength developed on the internal combustion engine. Thus, the summation circuit delivers to the phase shifter 14 a composed voltage equal to the control voltage $V_C$ stored by the potentiometer 28 added to the DC voltage $V_K$ from the discrimination circuit 24.

Therefore, if the engine is knocking then the ignition timing corrected with the control voltage $V_C$ is additionally corrected with the DC voltage $V_K$ indicating that the knocking requires the ignition timing to be further retarded resulting in the optimum ignition timing. In other words, another closed loop control is effected so that, the internal combustion engine increases the retardation of the ignition timing to futher retard the latter to thereby suppress the knocking and upon the stoppage of the knocking the phase shifter decreases the retardation of the ignition timing or advances it. This results in the additional correction of the ignition timing having the regular advance characteristic (see solid line f FIG. 2) previously corrected through the first-mentioned closed loop control to the optimum one at which the engine has a high efficiency without knocking.

From the foregoing it is seen that the present invention effectively corrects a shift in the ignition timing and also controls the ignition timing in response to knocking occurring in the internal combustion engine with an extremely simple construction by which, upon the occurrence of knocking, the knocking sensed output $V_K$ is used to control voltage $V_C$ mechanically stored in the position of the tap of the potentiometer 28 and applied, as the control input, to the phase shifter 14 for correcting a shift of the ignition timing to the regular timing.

In summary, the present invention is arranged to generate a reference signal at a reference angular position and an ignition signal having the advance characteristic preliminarily leading by a predetermined angle and to correct the ignition signal to the regular ignition timing by controlling a retardation of the ignition signal so as to put the phase relationship between the reference signal and a retarded ignition signal resulting from the retardation of the ignition signal in a predetermined state during a predetermined mode of operation of an associated internal correcting signal. Furthermore, the present invention is enabled in the normal mode of operation of the engine to correct the ignition timing with a control magnitude stored in a mechanical (i.e. the movable tap of the potentiometer) memory means. Therefore, the present invention eliminates the necessity of adjusting the initial ignition timing and also can always provide the regular ignition timing characteristic by correcting shifts of the ignition timing due to ageing of the engine components. Also, by providing means for controlling a control magnitude on memory means applied, as control input, to phase shifter means for controlling the retardation of the ignition timing with a knocking sensed output obtained during the knocking of the engine, the ignition timing can be effectively controlled to be suited for eliminating the knocking of the engine with a simple construction utilizing the phase shifter means. Thus, the present invention can effect the optimum control of the ignition timing suited even for the knocking status of the internal combustion engine.

While the present invention has been illustrated and described in conjunction with a single preferred embodiment thereof it is to be understood that numerous changes and modifications may be resorted to without departing from the spirit and scope of the present invention.

What is claimed is:

1. An ignition time correcting system for an internal combustion engine comprising a reference generator means for generating a reference signal at a reference angular position of the rotation of an internal combustion engine, an ignition generator means for generating a ignition signal at an angular position of the rotation of the engine leading that for said reference signal, said ignition signal having a predetermined advance characteristic, a phase shifter means connected to said ignition generator means to control a retardation of said ignition signal in response to a control input applied thereto, an ignition means connected to said phase shifter means to generate an ignition voltage with an output from said phase shifter means, a control signal generator means for generating a control signal for determining the retardation of said ignition signal provided by said phase shifter means, a control means for controlling a magnitude of said control signal in response to the phase relationship between said reference signal and said output from said phase shifter means so as to impart to said output from said phase shifter means a predetermined phase relative to said reference signal in a predetermined mode of operation of the internal combustion engine, a knocking sensor means for sensing a knocking status of the internal combustion engine, and a correction means connected said knocking sensor means to control a magnitude of said control input to said phase shifter means.

2. An ignition timing correcting system for an internal combustion engine is claimed in claim 1, wherein said correction means is formed of a summation circuit for adding said control signal from said control signal generator means to said sensed output from said knocking sensor means.

3. An ignition timing correcting system for an internal combustion engine as claimed in claim 1, wherein said correction means includes means for disabling said sensed output from said knocking sensor means to control said control input to said phase shifter means in a predetermined mode of operation of the internal combustion engine.

4. An ignition timing correcting system as claimed in any one of claims 1-3, wherein said control signal generator means stores the value of said control signal.

* * * * *